(12) United States Patent
Okajima

(10) Patent No.: US 10,714,929 B2
(45) Date of Patent: *Jul. 14, 2020

(54) POWER CONTROL DEVICE

(71) Applicant: Rohm Co., Ltd., Kyoto (JP)

(72) Inventor: Kenichi Okajima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 31 days.

This patent is subject to a terminal disclaimer.

(21) Appl. No.: 16/287,713

(22) Filed: Feb. 27, 2019

(65) Prior Publication Data

US 2019/0199083 A1  Jun. 27, 2019

Related U.S. Application Data

(63) Continuation of application No. 16/034,497, filed on Jul. 13, 2018, now Pat. No. 10,256,623.

(30) Foreign Application Priority Data

Aug. 21, 2017 (JP) .................................. 2017-158846
Mar. 16, 2018 (JP) .................................. 2018-049584

(51) Int. Cl.
| | | |
|---|---|---|
| *G05F 1/571* | (2006.01) | |
| *H02H 7/12* | (2006.01) | |
| *H02H 1/00* | (2006.01) | |
| *G05F 1/595* | (2006.01) | |
| *H02M 1/088* | (2006.01) | |
| *G05F 1/575* | (2006.01) | |
| *H02M 3/158* | (2006.01) | |
| (Continued) | | |

(52) U.S. Cl.
CPC ........... *H02H 7/1213* (2013.01); *G05F 1/571* (2013.01); *G05F 1/575* (2013.01); *G05F 1/595* (2013.01); *H02H 1/0007* (2013.01); *H02H 3/202* (2013.01); *H02M 1/088* (2013.01); *H02M 1/36* (2013.01); *H02M 3/158* (2013.01); *G05F 1/562* (2013.01); *G05F 1/569* (2013.01); *H02H 3/20* (2013.01); *H02M 2001/0006* (2013.01)

(58) Field of Classification Search
CPC ................................. G05F 1/562; G05F 1/571
USPC ......... 323/274, 276, 284; 361/18, 91.1, 91.8
See application file for complete search history.

(56) References Cited

U.S. PATENT DOCUMENTS

2005/0077882 A1  4/2005  Nishino
2008/0030173 A1  2/2008  Nishino
(Continued)

FOREIGN PATENT DOCUMENTS

| CN | 1607715 | 4/2005 |
|---|---|---|
| CN | 107147082 | 9/2017 |
| JP | 2010-220454 | 9/2010 |

OTHER PUBLICATIONS

Office Action issued in Chinese Application No. 201810955777.1 dated Mar. 23, 2020, 8 pages.

*Primary Examiner* — Gary A Nash
(74) *Attorney, Agent, or Firm* — Fish & Richardson P.C.

(57) ABSTRACT

A power control device includes: an output voltage controller configured to control an output voltage based on a feedback voltage corresponding to the output voltage; and an overvoltage protector configured to continue or stop the operation of the output voltage controller based on a first detection result of whether the output voltage has exceeded an output voltage threshold value and a second detection result of whether the feedback voltage has fallen to or below a feedback voltage threshold value.

12 Claims, 11 Drawing Sheets

(51) Int. Cl.
H02H 3/20 (2006.01)
H02M 1/36 (2007.01)
G05F 1/569 (2006.01)
H02M 1/00 (2006.01)
G05F 1/56 (2006.01)

(56) References Cited

U.S. PATENT DOCUMENTS

| | | | |
|---|---|---|---|
| 2008/0094045 A1* | 4/2008 | Lin | G05F 1/56 |
| | | | 323/274 |
| 2008/0180071 A1* | 7/2008 | Moraveji | G05F 1/575 |
| | | | 323/268 |
| 2008/0218139 A1* | 9/2008 | Takagi | G05F 1/575 |
| | | | 323/280 |
| 2009/0085547 A1 | 4/2009 | Nishino | |
| 2012/0170165 A1* | 7/2012 | Jung | H02H 1/06 |
| | | | 361/86 |
| 2013/0234687 A1* | 9/2013 | Fujimura | G05F 1/10 |
| | | | 323/282 |
| 2015/0015224 A1* | 1/2015 | Yasusaka | G05F 1/575 |
| | | | 323/280 |
| 2018/0367027 A1 | 12/2018 | Chen et al. | |

* cited by examiner

POWER CONTROL DEVICE

This application is a continuation of U.S. patent application Ser. No. 16/034,497, filed Jul. 13, 2018, which claims priority to Japanese Patent Application No. 2017-158846 filed on Aug. 21, 2017 and Japanese Patent Application No. 2018-049584 filed on Mar. 16, 2018, contents of both of which are hereby incorporated by reference.

BACKGROUND OF THE INVENTION

Field of the Invention

This invention relates to a power control device.

Description of the Related Art

Conventionally, there are known power supply circuits that include an overvoltage protection circuit to perform protection against an overvoltage in an output voltage.

FIG. 11 shows one exemplary configuration of a power supply circuit having an overvoltage protection circuit as mentioned above. The power supply circuit 100A shown in FIG. 11 is what is called a linear regulator, which is a kind of DC-DC converter. The power supply circuit 100A includes an output transistor 101, an error amplifier 102, an overvoltage protection circuit 103A, and resistors R1 and R2.

To the drain of the output transistor 101, which is an n-channel MOSFET, an input voltage Vin is applied. To the source of the output transistor 101, an output terminal Tout, from which an output voltage Vout is output, is connected. The source of the output transistor 101 is connected to a ground potential via a serially connected arrangement of the resistors R1 and R2. The resistors R1 and R2 divide the output voltage Vout.

The connection node at which the resistors R1 and R2 are connected together is connected to the inverting input terminal of the error amplifier 102. To the non-inverting input terminal of the error amplifier 102, a reference voltage Vref is applied. The output terminal of the error amplifier 102 is connected to the gate of the output transistor 101.

In this configuration, the error amplifier 102 drives the gate of the output transistor 101 so that a feedback voltage FB, which is generated by dividing the output voltage Vout with the resistors R1 and R2, equals the reference voltage Vref. Thus, the output voltage Vout is controlled to the voltage value given by Formula (1) below.

$$V\text{out} = ((R1+R2)/R2) \times V\text{ref} \quad (1)$$

The overvoltage protection circuit 103A monitors the feedback voltage FB, and when the feedback voltage FB exceeds the threshold voltage value set as an overvoltage, the overvoltage protection circuit 103A stops an output operation of the error amplifier 102. With this, when the output voltage Vout rises to reach the overvoltage, the feedback voltage FB also rises to exceed the threshold voltage value; thus, the output operation of the error amplifier 102 is stopped, and accordingly the output voltage Vout lowers. In this way, overvoltage protection in the output voltage Vout is performed.

FIG. 12 shows another exemplary configuration of a power supply circuit having an overvoltage protection circuit. The power supply circuit 100B shown in FIG. 12 is a linear regulator like the power supply circuit 100A shown in FIG. 11, but differs from this in configuration in that the power supply circuit 100B has an overvoltage protection circuit 103B.

The overvoltage protection circuit 103B directly monitors the output voltage Vout, and when the output voltage Vout exceeds a set overvoltage value, it stops the output operation of the error amplifier 102.

For another example, Japanese Patent Application published as No. 2010-220454 also discloses a power supply circuit that performs overvoltage protection.

However, the power supply circuit 100A shown in FIG. 11 and the power supply circuit 100B shown in FIG. 12 described above have the following problems respectively. In the power supply circuit 100A, when the resistor R1 becomes open or the resistor R2 is short-circuited, an abnormal drop in the feedback voltage causes the error amplifier 102 to increase the output voltage Vout up to an overvoltage, but the feedback voltage FB lowers, so the overvoltage protection circuit 103A cannot detect the overvoltage and the overvoltage protection function does not come into effect.

On the other hand, in the power supply circuit 100B, when the resistor R1 is open or the resistor R2 is short-circuited as above and the output voltage Vout rises, since the overvoltage protection circuit 103B directly monitors the output voltage Vout, overvoltage protection can be performed.

However, when the output transistor 101, the error amplifier 102 and the overvoltage protection circuit 103B are configured so as to be included in one IC, and the resistors R1 and R2 are provided externally to the IC, the output voltage Vout can be set with the resistance values of the resistors R1 and R2 as seen from Formula (1). In that case, it is difficult to do overvoltage setting properly for all possible output voltages Vout with a common IC, that is, with the overvoltage protection circuit 103B.

Against the background discussed above, the present invention intends to provide a power control device that can perform overvoltage protection in the output voltage even if the feedback voltage is abnormal and that facilitates proper overvoltage setting.

SUMMARY OF THE INVENTION

A power control device according to one aspect of the present invention includes: an output voltage controller configured to control an output voltage based on a feedback voltage corresponding to the output voltage; and an overvoltage protector configured to continue or stop the operation of the output voltage controller based on a first detection result of whether the output voltage has exceeded an output voltage threshold value and a second detection result of whether the feedback voltage has fallen to or below a feedback voltage threshold value.

DESCRIPTION OF THE PREFERRED EMBODIMENTS

Hereinafter, one embodiment of the present invention will be described with reference to the accompanying drawings.

First Embodiment

Figure 1:
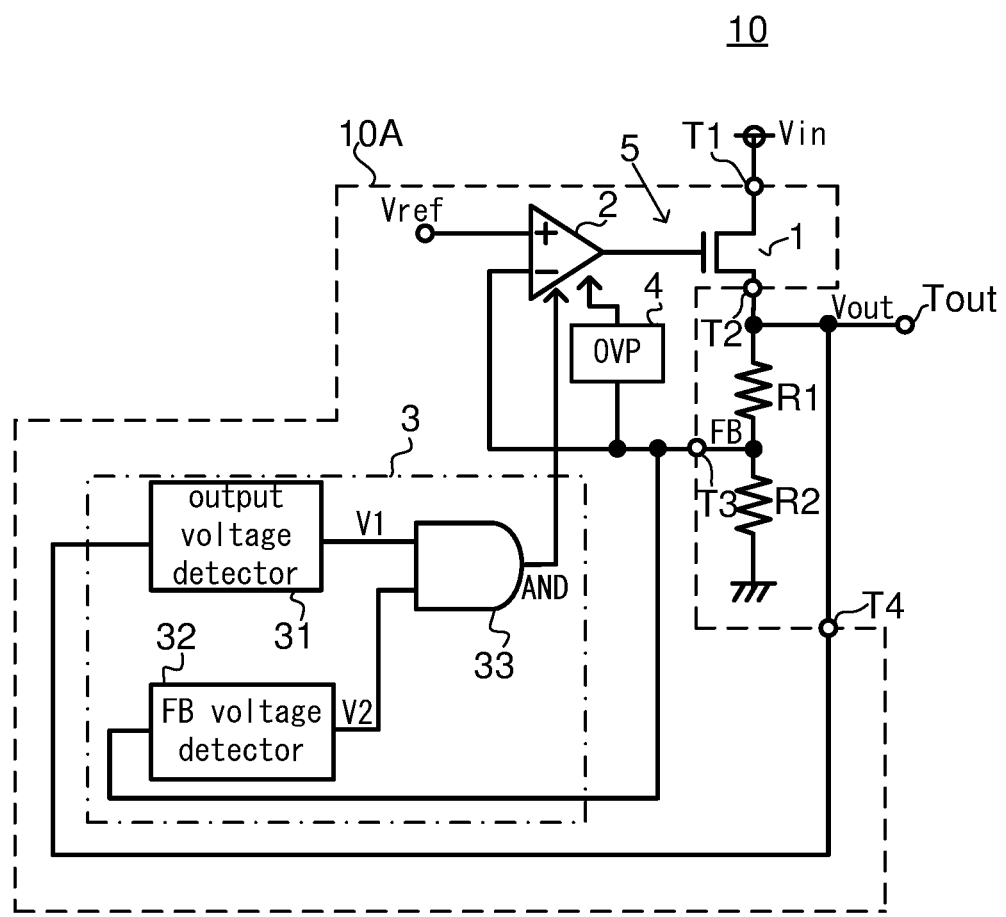
FIG. 1 is a diagram showing a configuration of a power supply circuit according to a first embodiment of the present invention.

FIG. 1 is a diagram showing the configuration of a power supply circuit 10 according to a first embodiment of the present invention. The power supply circuit 10 is configured as a DC-DC converter, or more specifically, a linear regulator. The power supply circuit 10 converts an input voltage Vin to an output voltage Vout.

The power supply circuit 10 includes a power supply IC 10A and external resistors R1 and R2. The power supply IC 10A is a power control device that controls, so as to keep constant, the output voltage Vout of the power supply circuit 10. The power supply IC 10A is a semiconductor integrated circuit having integrated in it an output transistor 1, an error amplifier 2, a first overvoltage protection circuit 3, and a second overvoltage protection circuit 4. The power supply IC 10A has terminals T1 to T4 via which to establish electrical connection with the outside. The output transistor 1 and the error amplifier 2 constitute an output voltage controller 5, which controls the output voltage Vout.

To the drain of the output transistor 1, which is configured as an n-channel MOSFET, an input voltage Vin is applied via the terminal T1. To the source of the output transistor 1, an output terminal Tout is connected via the terminal T2. At the output terminal Tout, the output voltage Vout appears. The terminal T2 is connected to a ground potential via a serially connected arrangement of the resistors R1 and R2. The resistors R1 and R2 divide the output voltage Vout.

The connection node at which the resistors R1 and R2 are connected together is connected to the inverting input terminal of the error amplifier 2 via the terminal T3. To the non-inverting input terminal of the error amplifier 2, a reference voltage Vref is applied. The output terminal of the error amplifier 2 is connected to the gate of the output transistor 1.

In this configuration, the error amplifier 2 drives the gate of the output transistor 1 so that a feedback voltage FB, which is generated by dividing the output voltage Vout with the resistors R1 and R2, equals the reference voltage Vref. Thus, the output voltage Vout is controlled at a voltage value calculated by Formula (1) above.

The first overvoltage protection circuit 3 includes an output voltage detector 31, a feedback voltage detector 32 (FB voltage detector), and an AND circuit 33, and performs protection against an overvoltage in the output voltage Vout.

The FB voltage detector 32 detects whether the feedback voltage FB that appears at the terminal T3 has fallen to or below a predetermined feedback voltage threshold value (FB voltage threshold value). The output voltage detector 31 detects whether the output voltage Vout which is input via the terminal T4 has risen above a predetermined output voltage threshold value. The detection outputs from the output voltage detector 31 and the FB voltage detector 32 are input to the AND circuit 33. The error amplifier 2 continues or stops the output operation in accordance with the output from the AND circuit 33.

Figure 2:
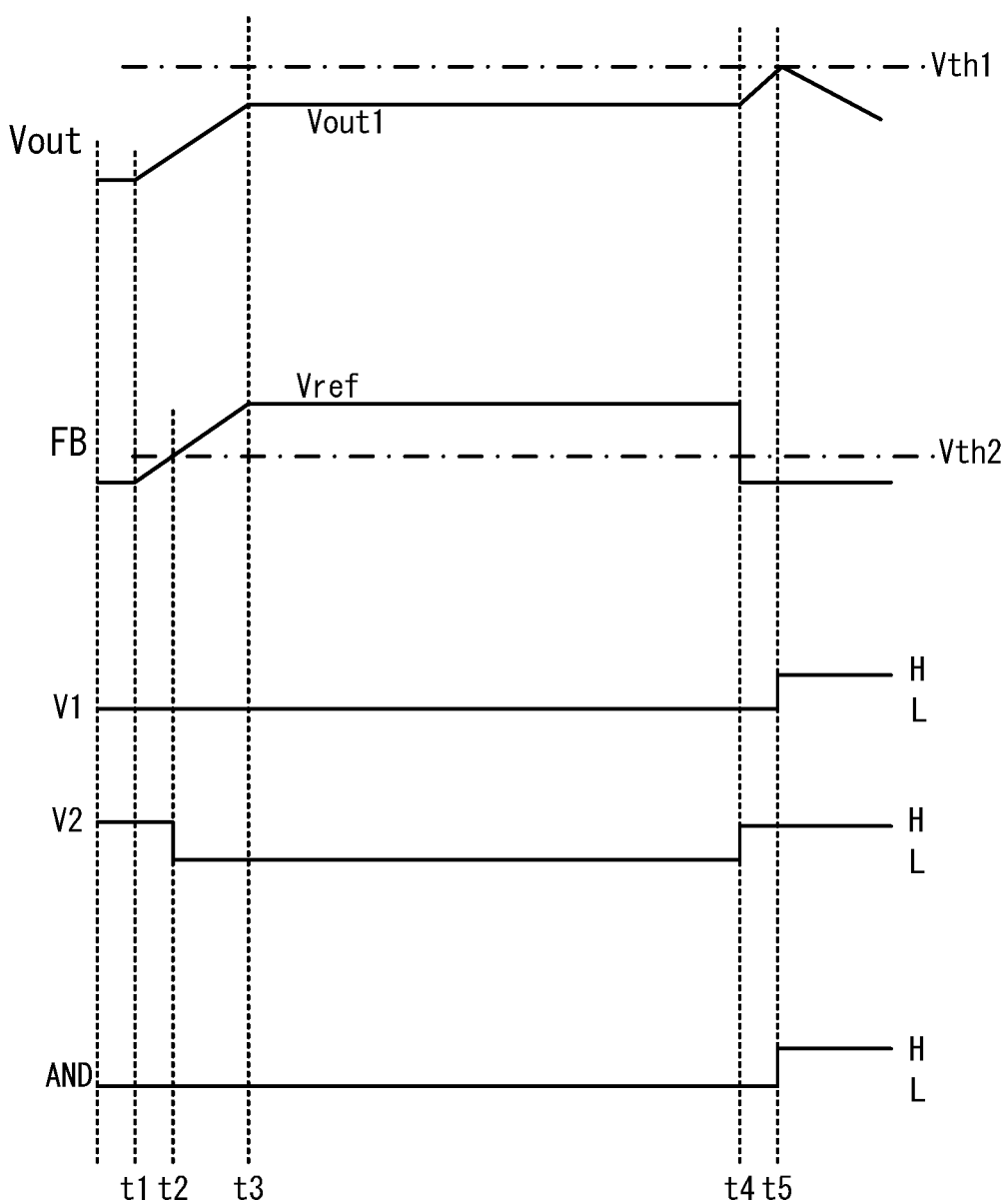
FIG. 2 is a timing chart showing one example of operation of an overvoltage protection circuit according to the first embodiment.

Now, the operation of the first voltage protection circuit 3 will be described with reference to a timing chart shown in FIG. 2. FIG. 2 shows, from top down, the output voltage Vout, the feedback voltage FB, a detection output V1 from the output voltage detector 31, a detection output V2 from the FB voltage detector 32, and an output AND from the AND circuit 33. FIG. 2 shows a case where, through the setting of the resistors R1 and R2, the output voltage Vout is set at a voltage Vout1 (for example 1V).

FIG. 2 also shows an output voltage threshold value Vth1 set in the output voltage detector 31, and a FB voltage threshold value Vth2 set in the FB voltage detector 32. The output voltage threshold value Vth1 is a voltage (for example, 1.2V) slightly higher than the voltage Vout1, and the FB voltage threshold value Vth2 is a voltage (for example, 0.2V) close to zero.

At time point t1 shown in FIG. 2, the error amplifier 2 starts up, and the output voltage Vout and the feedback voltage FB begin to rise. Here, the output voltage Vout equals zero, and is thus equal to or lower than the output voltage threshold value Vth1, so the detection output V1 is Low. The feedback voltage FB equals zero, and thus the feedback voltage FB is equal to or lower than the FB voltage threshold value Vth2, so the detection output V2 is High. Accordingly, the output AND is Low. When the output AND is Low, the error amplifier 2 continues the output operation.

At time point t2, when the feedback voltage FB rises to or above the FB voltage threshold value Vth2, the detection output V2 becomes Low. Thus, the output AND is Low.

At time point t3, when the feedback voltage FB reaches the reference voltage Vref, and the output voltage Vout reaches the voltage Vout1, both the feedback voltage FB and the output voltage Vout become constant. When the feedback voltage FB and the output voltage Vout are constant, both the detection outputs V1 and V2 are Low, so the output AND is Low.

At time point t4, if the resistor R1 becomes open, or the resistor R2 is short-circuited, the feedback voltage FB rapidly falls to or below the FB voltage threshold value Vth2, and the FB voltage detector 32 turns the detection output V2 High. Here, the detection output V1 is Low, so the output AND is Low.

Then, due to an abnormal drop in the feedback voltage FB, the output voltage Vout rises to exceed the output voltage threshold value Vth1 at time point t5. Here, the output voltage detector 32 turns the detection output V1

High, so the output AND becomes High. With this, the error amplifier 2 stops the output operation, and the output voltage Vout goes down. In this way, protection can be performed against an overvoltage in the output voltage Vout caused by an open circuit in the resistor R1 or a short circuit in the resistor R2.

As described above, if the feedback voltage FB is equal to or lower than the FB voltage threshold value Vth2 but the output voltage Vout is equal to or lower than the output voltage threshold value Vth1, it is judged that the circuit is starting up, so the output operation of the output voltage Vout is continued (time point t1 to t2). If the feedback voltage FB is above the FB voltage threshold value Vth2, it is judged that the circuit is in a normal state, so the output operation of the output voltage Vout is continued (time point t2 to t4). If the feedback voltage FB falls to or below the FB voltage threshold value Vth2, and in addition the output voltage Vout rises above the output voltage threshold value Vth1, it is judged that an overvoltage has occurred due to an open circuit in the resistor R1 or a short circuit in the resistor R2, and the output operation of the output voltage Vout is stopped for overvoltage protection (after time point t5).

Figure 3:
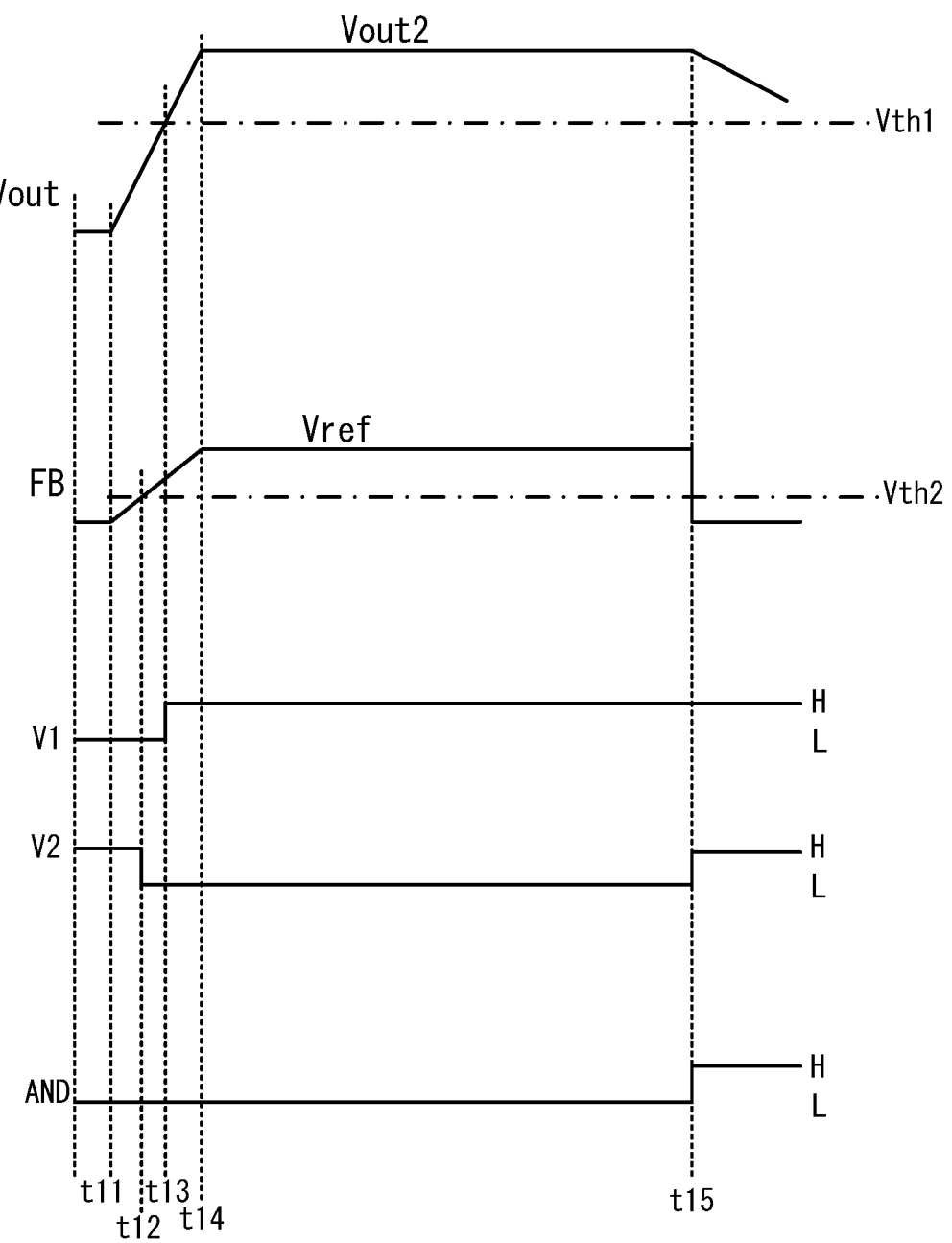
FIG. 3 is a timing chart showing one example of operation of an overvoltage protection circuit according to the first embodiment.

FIG. 3 is a timing chart corresponding to FIG. 2, and it shows a case where, through the setting of the resistors R1 and R2, the output voltage Vout is set at a voltage Vout2 (for example, 5V) higher than the voltage Vout1.

At time point t11 shown in FIG. 3, the error amplifier 2 starts up, and the output voltage Vout and the feedback voltage FB begin to rise. Here, the detection output V1 is Low, and the detection output V2 is High, so the output AND is Low.

At time point t12, when the feedback voltage FB rises to exceed the FB voltage threshold value Vth2, the detection output V2 becomes Low. Thus, the output AND is Low.

Thereafter, the output voltage Vout rises, and when it exceeds the output voltage threshold value Vth1 at time point t13, the detection output V1 turns High, but the detection output V2 is Low, so the output AND is Low, resulting in the continued output operation of the error amplifier 2.

At time point t14, when the feedback voltage FB reaches the reference voltage Vref, and the output voltage Vout reaches the voltage Vout2, both the feedback voltage FB and the output voltage Vout become constant. When the feedback voltage FB and the output voltage Vout are constant, the detection output V1 is High, and the detection output V2 is low, so the output AND is Low.

At time point t15, if the resistor R1 becomes open, or the resistor R2 is short-circuited, the feedback voltage FB rapidly falls to or below the FB voltage threshold value Vth2, and the FB voltage detector 32 turns the detection output V2 High. Here, the detection voltage V1 is High, so the output AND turns High. With this, the error amplifier 2 stops the output operation, and the output voltage Vout goes down. Thus, the output voltage Vout2 drops without rising up to an overvoltage, and overvoltage protection is performed.

As described above, if the feedback voltage FB is equal to or lower than the FB voltage threshold value Vth2, and the output voltage Vout is equal to or lower than the output voltage threshold value Vth1, it is judged that the circuit is starting up, so the output operation of the output voltage Vout is continued (time point t11 to t12). If the feedback voltage FB is above the FB voltage threshold value Vth2, it is judged that the circuit is in a normal state, so the output operation of the output voltage Vout is continued (time point t12 to t15). If the feedback voltage FB falls to or below the FB voltage threshold value Vth2, and in addition the output voltage Vout rises above the output voltage threshold value Vth1, it is judged that an overvoltage has occurred due to an open circuit in the resistor R1 or a short circuit in the resistor R2, and the output operation of the output voltage Vout is stopped for overvoltage protection (after time point t15).

As described with reference to FIG. 2 and FIG. 3, even in a case where, through the setting of the external resistors R1 and R2, the output voltage Vout (Vout1, Vout2) is variably set with respect to a common power supply IC 10A, by allowing overvoltage setting in the overvoltage protection circuit 3 based on the output voltage threshold value Vth1 and the FB voltage threshold value Vth2, it is possible to perform overvoltage protection for the output voltage Vout in either setting. This makes proper overvoltage setting easy.

The second overvoltage protection circuit 4 monitors the feedback voltage FB, and if the feedback voltage FB exceeds a predetermined overvoltage set value, it stops the output operation of the error amplifier 2. With this, even if an overvoltage occurs in the output voltage Vout with the resistors R1 and R2 in a normal state, overvoltage protection can still be performed. In other words, by providing not only the first overvoltage protection circuit 3 but also the second overvoltage protection circuit 4, it becomes possible to handle overvoltages due to various causes.

Second Embodiment

Figure 4:
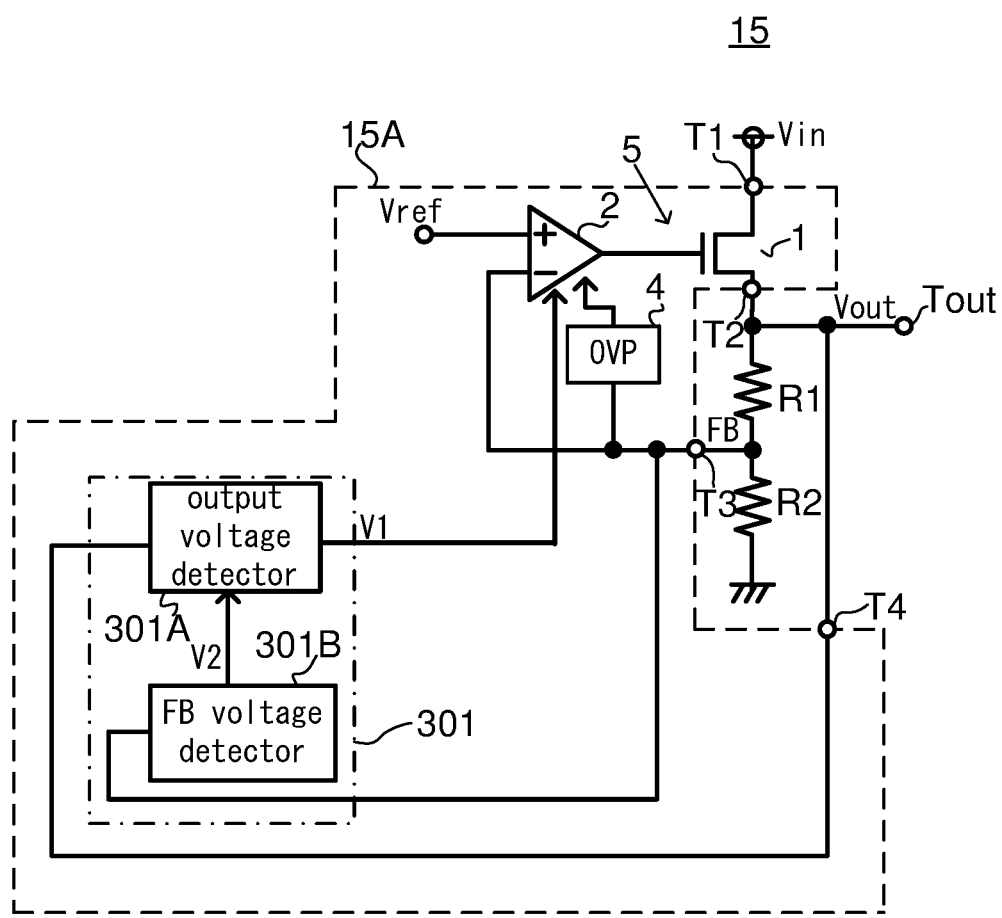
FIG. 4 is a diagram showing a configuration of a power supply circuit according to a second embodiment of the present invention.

FIG. 4 is a diagram showing the configuration of a power supply circuit 15 according to a second embodiment of the present invention. A power supply circuit 15 shown in FIG. 4 is configured as a linear regulator just like the power supply circuit 10 according to the first embodiment described above. The power supply circuit 15 has a power supply IC 15A. A difference from the first embodiment in configuration is that the power supply IC 15A has a first overvoltage protection circuit 301.

The first overvoltage protection circuit 301 has an output voltage detector 301A and a FB voltage detector 301B. The output voltage detector 301A continues or stops the detection operation according to a detection output V2 from the FB voltage detector 301B. The output voltage detector 301A outputs a detection output V1 to an error amplifier 2. The error amplifier 2 continues or stops the output operation according to the detection output V1.

Figure 5:
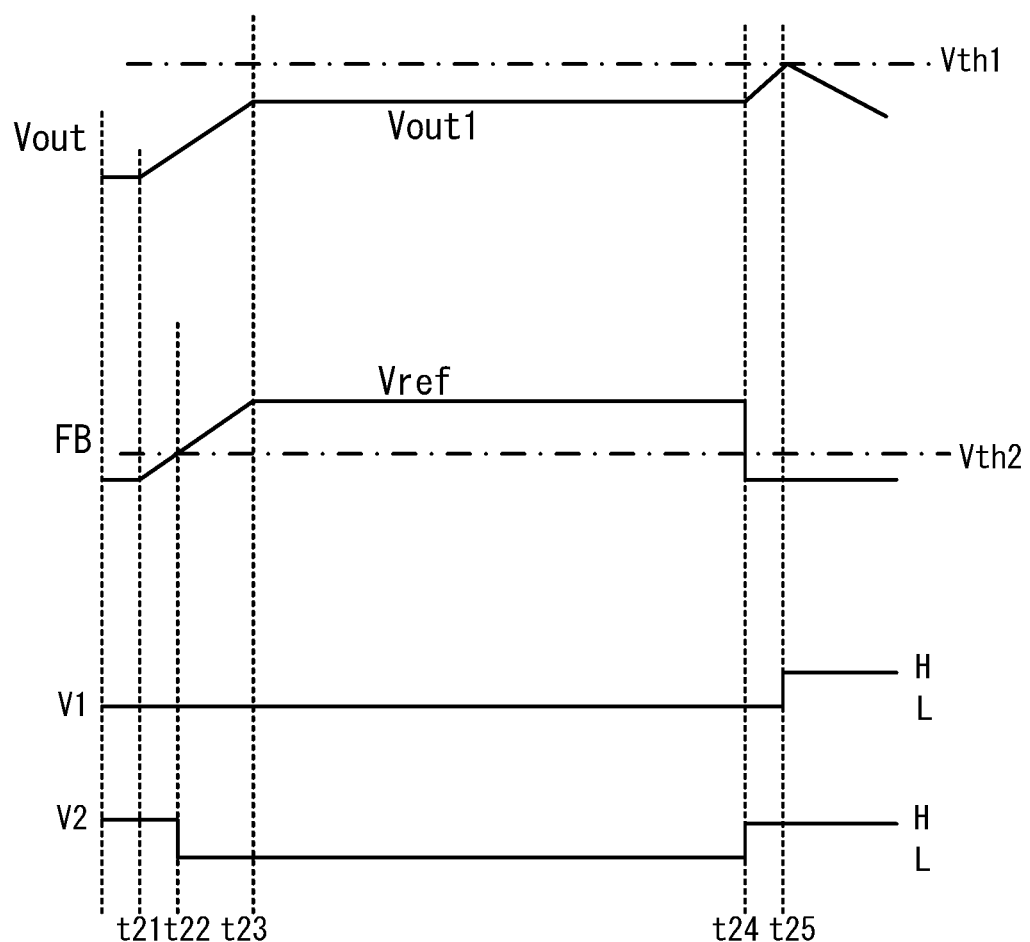
FIG. 5 is a timing chart showing one example of operation of an overvoltage protection circuit according to the second embodiment.

Now, the operation of the first voltage protection circuit 301 will be described with reference to a timing chart shown in FIG. 5. FIG. 5 shows, from top down, the output voltage Vout, the feedback voltage FB, the detection output V1 from the output voltage detector 301A, and the detection output V2 from the FB voltage detector 301B. FIG. 5 shows a case where, through the setting of resistors R1 and R2, the output voltage Vout is set at a voltage Vout1.

FIG. 5 also shows an output voltage threshold value Vth1 set in the output voltage detector 301A, and a FB voltage threshold value Vth2 set in the FB voltage detector 301B. The output voltage threshold value Vth1 is a voltage slightly higher than the voltage Vout1, and the FB voltage threshold value Vth2 is a voltage close to zero.

At time point t21 shown in FIG. 5, the error amplifier 2 starts up, and the output voltage Vout and the feedback voltage FB begin to rise. The feedback voltage FB equals zero, and thus the feedback voltage FB is equal to or lower than the FB voltage threshold value Vth2, so the detection output V2 is High. With this, the output voltage detector 301A performs a detection operation. Here, the output voltage Vout equals zero, and is thus equal to or lower than the output voltage threshold value Vth1, so the detection output V1 is Low. When the detection output V1 is Low, the error amplifier 2 continues the output operation.

At time point t22, when the feedback voltage FB rises to exceed the FB voltage threshold value Vth2, the detection output V2 becomes Low. With this, the output voltage detector 301A stops the detection operation, so the detection output V1 becomes Low.

At time point t23, when the feedback voltage FB reaches a reference voltage Vref, and the output voltage Vout reaches the voltage Vout1, the feedback voltage FB and the output voltage Vout become constant. When the feedback voltage FB and the output voltage Vout are constant, both the detection outputs V1 and V2 are Low.

At time point t24, if the resistor R1 becomes open, or the resistor R2 is short-circuited, the feedback voltage FB rapidly falls to or below the FB voltage threshold value Vth2, and the FB voltage detector 301B turns the detection output V2 High. With this, the output voltage detector 301A starts up. Here, the output voltage Vout is equal to or lower than the output voltage threshold value Vth1, so the detection output V1 is Low.

Then, due to an abnormal drop in the feedback voltage FB, the output voltage Vout rises and at time point t25, it exceeds the output voltage threshold value Vth1. Here, the output voltage detector 301A turns the detection output V1 High. With this, the error amplifier 2 stops the output operation, and the output voltage Vout goes down. In this way, protection can be performed against an overvoltage in the output voltage Vout caused by an open circuit in the resistor R1 or a short circuit in the resistor R2.

Figure 6:
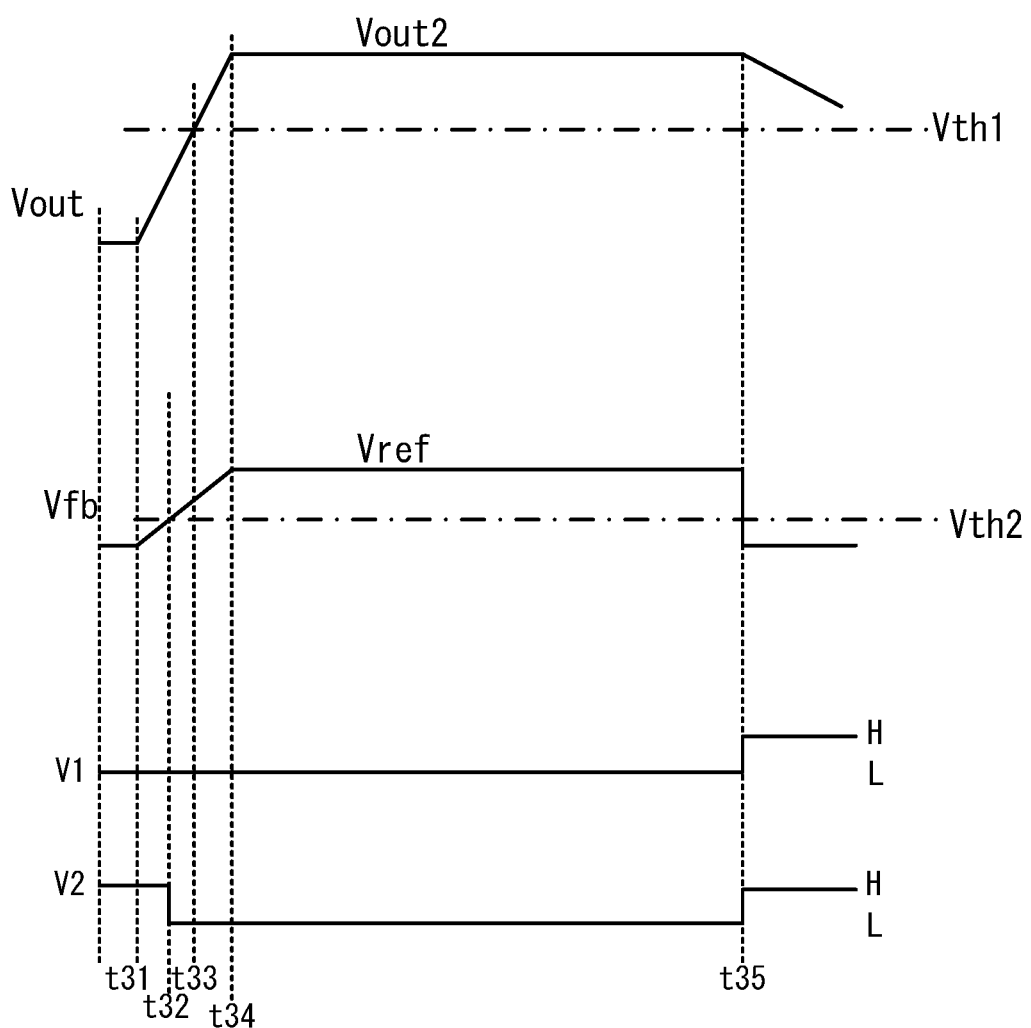
FIG. 6 is a timing chart showing one example of operation of an overvoltage protection circuit according to the second embodiment.

FIG. 6 is a timing chart corresponding to FIG. 5, and it shows a case where, through the setting of the resistors R1 and R2, the output voltage Vout is set at a voltage Vout2 higher than the voltage Vout1.

At time point t31 shown in FIG. 6, the error amplifier 2 starts up, and the output voltage Vout and the feedback voltage FB begin to rise. Here, since the detection output V2 is High, the output voltage detector 301A is performing a detection operation, so the detection output V1 is Low.

At time point t32, when the feedback voltage FB rises to exceed the FB voltage threshold value Vth2, the detection output V2 becomes Low. With this, the output voltage detector 301A stops the detection operation, so the detection output V1 is Low.

Thereafter, the output voltage Vout rises and at time point 33, it exceeds the output voltage threshold value Vth1, but since the detection output V2 is Low and thus the output voltage detector 301A is inactive, the detection output V1 is Low.

At time point t34, when the feedback voltage FB reaches the reference voltage Vref, and the output voltage Vout reaches the voltage Vout2, both the feedback voltage FB and the output voltage Vout become constant. When the feedback voltage FB and the output voltage Vout are constant, both the detection outputs V1 and V2 are Low.

At time point t35, if the resistor R1 becomes open, or the resistor R2 is short-circuited, the feedback voltage FB rapidly falls to or below the FB voltage threshold value Vth2, and the FB voltage detector 301B turns the detection output V2 High. With this, the output voltage detector 301A starts up. Since the output voltage Vout exceeds the output voltage threshold value Vth1, the detection output V1 becomes High. Thus, the error amplifier 2 stops the output operation, and the output voltage Vout goes down. In this way, the output voltage Vout drops without rising up to an overvoltage, and overvoltage protection is performed.

With this second embodiment, effects similar to those with the first embodiment can be obtained. However, in the second embodiment, the output voltage detector 301A remains inactive until it is started up by the FB voltage detector 301B, and this helps reduce power consumption.

Third Embodiment

Figure 7:
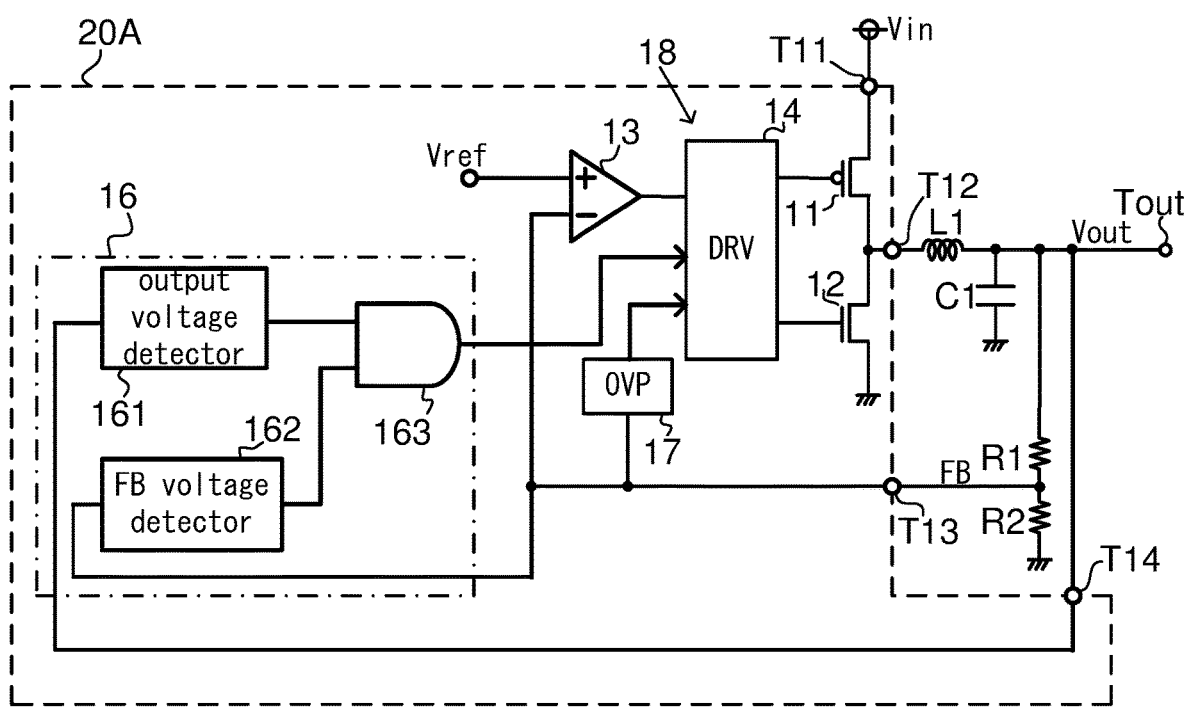
FIG. 7 is a diagram showing a configuration of a power supply circuit according to a third embodiment of the present invention.

FIG. 7 is a diagram showing the configuration of a power supply circuit 20 according to a third embodiment of the present invention. The power supply circuit 20 shown in FIG. 7 is a DC-DC converter, or more specifically, a synchronous rectification switching regulator. The power supply circuit 20 converts an input voltage Vin to an output voltage Vout. The power supply circuit 20 includes a power supply IC 20A, a coil L1, a capacitor C1, and resistors R1 and R2. The power supply IC 20A is a power control device that controls, so as to keep constant, the output voltage Vout of the power supply circuit 20. The coil L1, the capacitor C1, and the resistors R1 and R2 are provided as components external to the power supply IC 20A.

The power supply IC 20A is a semiconductor integrated circuit having integrated in it a first switching element 11, a second switching element 12, an error amplifier 13, a driver 14, a first overvoltage protection circuit 16, and a second overvoltage protection circuit 17. The error amplifier 13, the driver 14, the first switching element 11, and the second switching element 12 constitute an output voltage controller 18 which controls the output voltage Vout. The power supply IC 20A has terminals T11 to T14 via which to establish electrical connection with the outside.

To the source of the first switching element 11, which is configured as a p-channel MOSFET, the input voltage Vin is applied via the terminal T11. The drain of the first switching element 11 is connected to the drain of the second switching element 12, which is configured as an n-channel MOSFET. The source of the second switching element 12 is connected to an application terminal for a ground potential. That is, the first switching element 11 and the second switching element 12 are connected in series between the input voltage and the ground potential.

To the connection node at which the first switching element 11 and the second switching element 12 are connected together, one end of the coil L1 is connected via the terminal T12. The other end of the coil L1 is connected to one end of the capacitor C1. The other end of the capacitor C1 is connected to the application terminal for the ground potential. To the connection node at which the coil L1 and the capacitor C1 are connected together, the output terminal Tout is connected. At the output terminal Tout, the output voltage Vout appears.

To a line on which the output voltage Vout appears, an application terminal for the ground potential is connected via a serially connected arrangement of the resistors R1 and R2. The connection node at which the resistors R1 and R2 are connected together is connected to the inverting input terminal of the error amplifier 13. To the non-inverting input terminal of the error amplifier 13, a reference voltage Vref is applied. The driver 14 drives the respective gates of the first switching element 11 and the second switching element 12 based on the output of the error amplifier 13. By the driver 14, the first switching element 11 and the second switching element 12 are switched complementarily.

The feedback voltage FB is generated by dividing the output voltage Vout with the resistors R1 and R2. The generated feedback voltage FB is input to the error amplifier 13, and the driver 14 drives the first switching element 11 and the second switching element 12. With this, the feedback voltage FB is controlled so as to be equal to the reference voltage Vref, and the output voltage Vout is controlled so as to be constant. Through the setting of the external resistors R1 and R2, the output voltage Vout can be set variably.

The first overvoltage protection circuit 16 has an output voltage detector 161, a FB voltage detector 162, and an AND circuit 163. Thus, the configuration of the first overvoltage protection circuit 16 is similar to that of the first overvoltage protection circuit 3 in the first embodiment. The driver 14 continues or stops the switching operation according to the output from the AND circuit 163. When performing overvoltage protection, the driver 14 turns off both the first switching element 11 and the second switching element 12.

The operation of the first overvoltage protection circuit 16 is similar to that in the above embodiment. Briefly described, even in a case where the output voltage Vout is variably set with the resistors R1 and R2, if the resistor R1 becomes open or the resistor R2 is short-circuited, the switching operation of the driver 14 is stopped by the first overvoltage protection circuit 16, and protection against an overvoltage in the output voltage Vout is performed. Also, proper overvoltage setting in the respective output voltage detector 161 and the FB voltage detector 162 can be easily done.

The second overvoltage protection circuit 17 has a function similar to that of the second overvoltage protection circuit 4 in the first embodiment.

In the power supply IC 20A according to this embodiment, usable instead of the first overvoltage protection circuit 16 is an overvoltage protection circuit with a configuration similar to that of the first overvoltage protection circuit 301 in the second embodiment.

Fourth Embodiment

Figure 8:
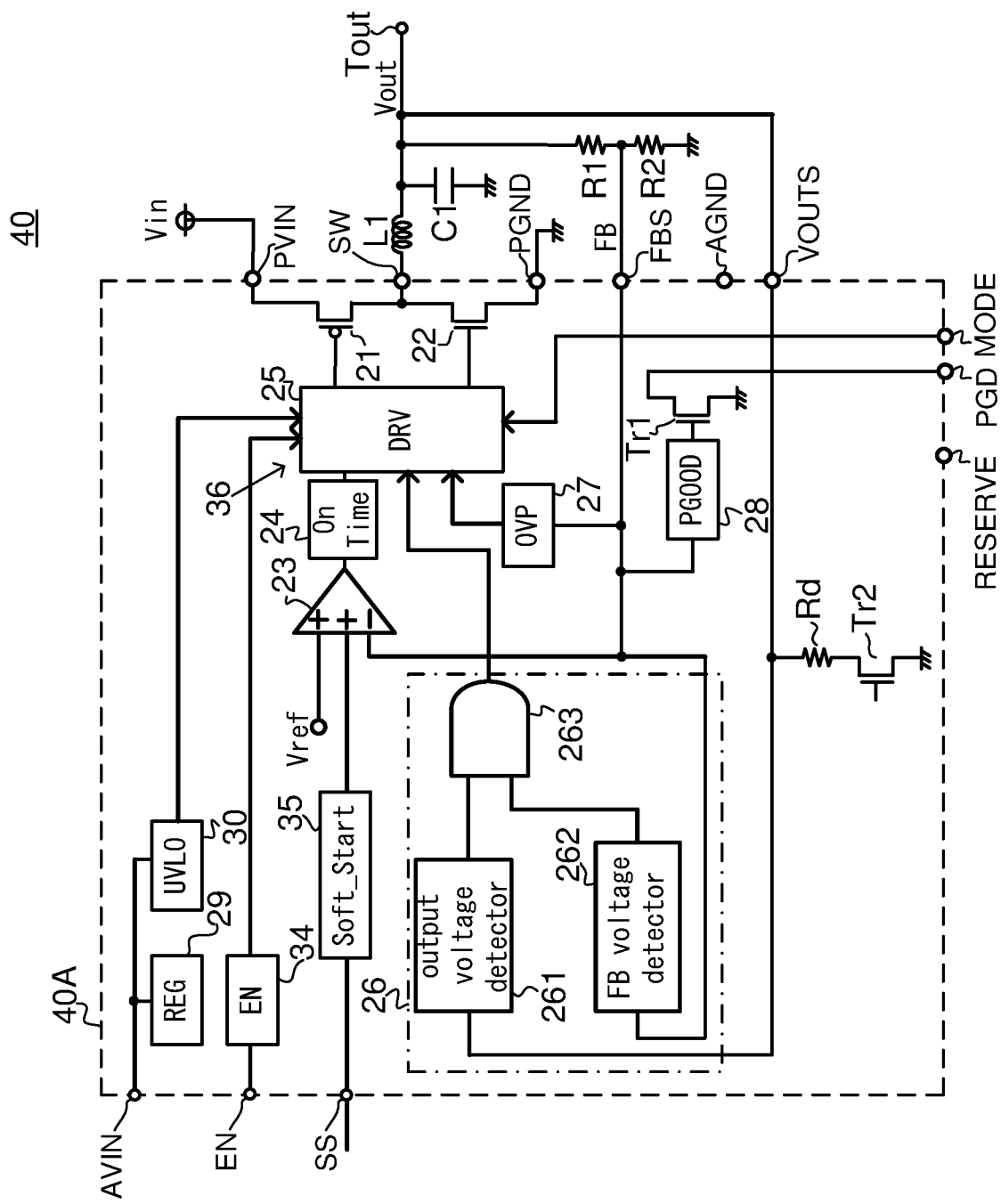
FIG. 8 is a diagram showing a configuration of a power supply circuit according to a fourth embodiment of the present invention.

FIG. 8 is a diagram showing the configuration of a power supply circuit 40 according to a fourth embodiment of the present invention. The power supply circuit 40 shown in FIG. 8 is a DC-DC converter, or more specifically, a synchronous rectification switching regulator. The power supply circuit 40 converts an input voltage Vin to an output voltage Vout. The power supply circuit 40 includes a power supply IC 40A, a coil L1, a capacitor C1, and resistors R1 and R2. The power supply IC 40A is a power control device which controls the output voltage Vout of the power supply circuit 40 so as to keep it constant using a fixed on-time control method. The coil L1, the capacitor C1, and the resistors R1 and R2 are provided as components external to the power supply IC 40A.

The power supply IC 40A is a semiconductor integrated circuit having integrated in it a first switching element 21, a second switching element 22, a comparator 23, an on-time generator 24, a driver 25, a first overvoltage protection circuit 26, a second overvoltage protection circuit 27, a power good portion 28, an internal power supply portion 29, a UVLO portion 30, an enable controller 34, and a soft starter 35. The comparator 23, the on-time generator 24, the driver 25, the first switching element 21, and the second switching element 22 constitute an output voltage controller 36 which controls an output voltage Vout. The power supply IC 40A has terminals, such as a terminal PVIN, via which to establish electrical connection with the outside.

To the source of the first switching element 21, which is configured as a p-channel MOSFET, the input voltage Vin is applied via the terminal PVIN. The drain of the first switching element 21 is connected to the drain of the second switching element 22, which is configured as an n-channel MOSFET. To the source of the second switching element 22, an application terminal for a ground potential is connected via a terminal PGND. That is, the first switching element 21 and the second switching element 22 are connected in series between the input voltage Vin and the ground potential.

To the connection node at which the first switching element 21 and the second switching element 22 are connected together, one end of the coil L1 is connected via a terminal SW. The other end of the coil L1 is connected to one end of the capacitor C1. The other end of the capacitor C1 is connected to the application terminal for the ground potential. To the connection node at which the coil L1 and the capacitor C1 are connected together, the output terminal Tout is connected. At the output terminal Tout, the output voltage Vout appears.

To a line on which the output voltage Vout appears, the application terminal for the ground potential is connected via a serially connected arrangement of the resistors R1 and R2. The connection node at which the resistors R1 and R2 are connected together is connected to the inverting input terminal of the comparator 23 via a terminal FBS. To one non-inverting input terminal of the comparator 23, a reference voltage Vref is applied.

The on-time generator 24 has the output of the comparator 23 input to it, and generates an on-time. The driver 25 drives the respective gates of the first switching element 21 and the second switching element 22 based on the output of the on-time generator 24. By the driver 25, the first switching element 21 and the second switching element 22 are switched complementarily.

A feedback voltage FB is generated by dividing the output voltage Vout with the resistors R1 and R2. The generated feedback voltage FB is input to the comparator 23. The on-time generator 24 generates a desired on-time when the output of the comparator 23 turns High. Here, the on-time generator suppresses frequency fluctuation by adjusting the on-time based on the input and output voltages.

The driver 25 keeps, only during the generated on-time period, the first switching element 21 on and the second switching element 22 off. When the on-time period expires, the driver 25 turns the first switching element 21 off and turns the second switching element 22 on. With this, the output voltage Vout is controlled so as to be constant. Through the setting of the external resistors R1 and R2, the output voltage Vout can be set variably.

The first overvoltage protection circuit 26 has an output voltage detector 261, a FB voltage detector 262, and an AND circuit 263. Thus, the configuration of the first overvoltage protection circuit 26 is similar to that of the first overvoltage protection circuit 3 in the first embodiment. To the output voltage detector 261, the output voltage Vout is input via a terminal VOUTS. To the FB voltage detector 262, the feedback voltage FB is input via the terminal FBS. The driver 25 continues or stops the switching operation according to the output from the AND circuit 263.

The operation of the first overvoltage protection circuit 26 is similar to that in the above embodiments. Briefly described, even in a case where the output voltage Vout is variably set with the resistors R1 and R2, if the resistor R1 becomes open or the resistor R2 is short-circuited, the switching operation of the driver 25 is stopped by the first overvoltage protection circuit 26, and protection against an overvoltage in the output voltage Vout is performed. Also, proper overvoltage setting in the respective output voltage detector 261 and the FB voltage detector 262 can be easily done.

The second overvoltage protection circuit 27 has a function similar to that of the second overvoltage protection circuit 4 in the first embodiment. To the second overvoltage protection circuit 27 and the after-mentioned power good portion 28, the feedback voltage FB is input via the terminal FBS.

In the power supply IC 40A according to this embodiment, usable instead of the first overvoltage protection circuit 26 is an overvoltage protection circuit with a configuration similar to that of the first overvoltage protection circuit 301 in the second embodiment.

The power good portion 28 is a block to realize a power good function. The power good portion 28 controls a transistor Tr1 to turn it on and off based on the feedback voltage FB. The drain of the transistor Tr1, which is an n-channel MOSFET, is connected to the terminal PGD, and the source of the transistor Tr1 is connected to the application terminal for the ground potential. The terminal PGD is pulled up to the output terminal Tout by a resistor (unillustrated). When the feedback voltage reaches a predetermined voltage, the power good portion 28 turns off the transistor Tr1 and outputs a High flag from the terminal PGD.

The terminal AVIN is a power terminal for the driver 25, and is connected to the terminal PVIN. The internal power supply portion 29 is a circuit block that generates an internal power supply. The UVLO portion 30 is a block for preventing a low-voltage malfunction. The UVLO portion 30 shuts down the device when the voltage at the terminal AVIN becomes equal to or lower than a predetermined voltage.

The enable controller 34 shuts down the device when the terminal EN is Low, and enables the device when the terminal EN is High.

The terminal SS is a terminal for setting the soft start time, and is connected to the input terminal of the soft start portion 35. The output terminal of the soft starter 35 is connected to another non-inverted input terminal of the comparator 23. According to the capacitance value of a capacitor (unillustrated) connected to the terminal SS, the start-up time of the output voltage Vout can be variably set.

To the terminal VOUTS, one end of a resistor Rd is connected. To the other end of the resistor Rd, the drain of the transistor Tr2, which is an n-channel MOSFET, is connected. The source of the transistor Tr2 is connected to the application terminal for the ground potential. When the device is shut down, the transistor Tr2 turns on, and this discharges the output capacitor C1. Thus, the terminal VOUTS is a terminal for output voltage detection and output discharge.

A terminal MODE is a terminal for setting the switching control mode. According to the level of the signal applied to the terminal MODE, whether the device operates in a fixed-frequency mode forcibly or shifts between Deep-SLLM control and the fixed-frequency mode is switched.

A terminal RESERVE is a reserve terminal, and is connected to ground. A terminal AGND is a ground terminal for the driver 25.

Figure 9:
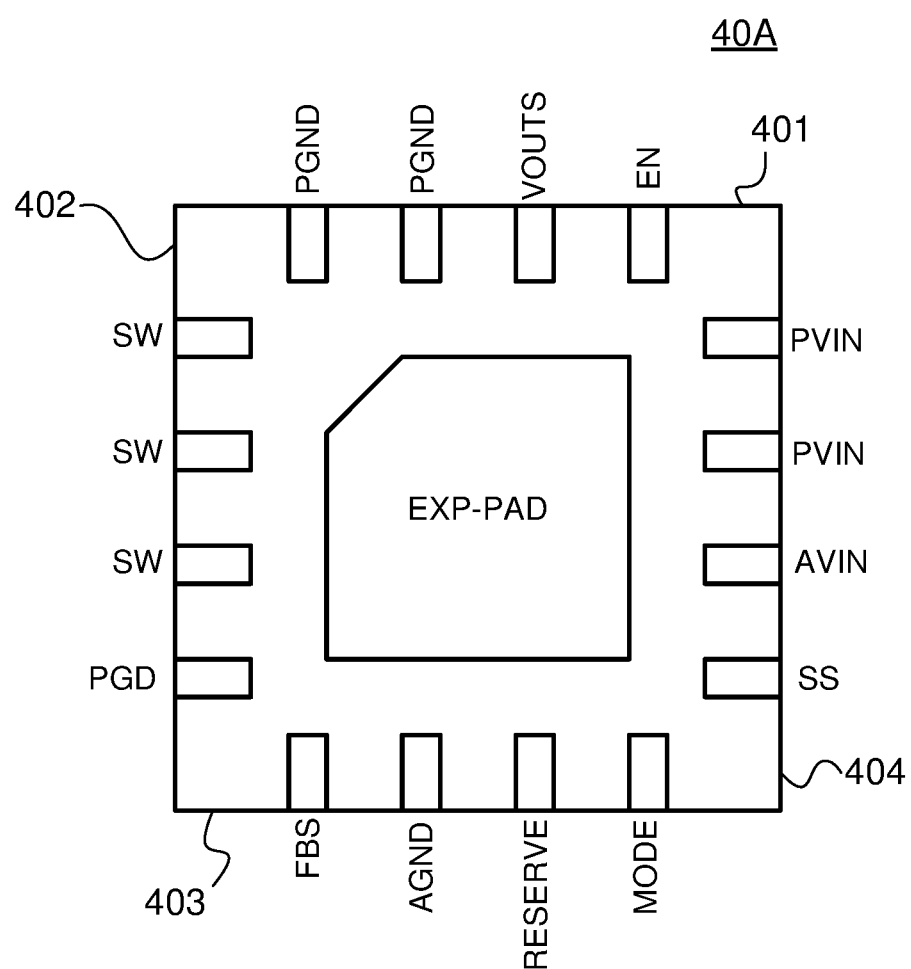
FIG. 9 is a plan view showing one example of pin arrangement in a power supply IC according to the fourth embodiment of the present invention.

FIG. 9 is a plan view showing one example of the pin arrangement in the power supply IC 40A as a semiconductor integrated circuit device (packaged product). The function of each terminal is as described above.

The power supply IC 40A is in a rectangular shape as seen in a plan view, and has a first side 401 which extends laterally. Arranged in a lateral row along the first side 401 are the terminal PGND, the terminal PGND, the terminal VOUTS, and the terminal EN in the order named. The aim of providing a plurality of terminals PGND is to allow the plurality of wires to be connected together inside the package to reduce the ON-resistance of the second switching element 22, thereby to improve efficiency.

A second side 402 extends longitudinally from one end of the first side 401. Arranged in a longitudinal row along the second side 402 are the terminal SW, the terminal SW, the terminal SW, and the terminal PGND in the order named. The aim of providing a plurality of terminal SW is to allow the plurality of wires to be connected together inside the package to reduce the ON-resistances of the first switching element 21 and the second switching element 22, thereby to improve efficiency.

A third side 403 extends laterally from an end part of the second side 402 opposite from the first side 401. Thus, the third side 403 faces the first side 401 longitudinally. Arranged in a lateral row on the third side 403 are the terminal FBS, the terminal AGND, the terminal RESERVE, and the terminal MODE in the order named.

A fourth side 404 extends longitudinally from an end part of the third side 403 opposite from the second side 402, and connects to an end part of the first side 401. Thus, the fourth side 404 faces the second side 402 laterally. Arranged in a longitudinal row along the fourth side 404 are the terminal SS, the terminal AVIN, the terminal PVIN, and the terminal PVIN in the order named. The aim of providing a plurality of terminal PVIN is to allow the plurality of wires to be connected together inside the package to reduce the ON-resistance of the first switching element 21, thereby to improve efficiency.

The rated voltages for all the terminals arranged on the fourth side 404 are high voltages. The rated voltages for all the terminals arranged on the third side 403 are low voltages. Thus, a group of high-voltage terminals and a group of low-voltage terminals are separated from each other. Of the terminals arranged on the first side 401, the terminal EN, which is arranged on its end part near the fourth side 404, has a high rated voltage, and the other terminals have low rated voltages. Thus, the terminal EN and the terminals arranged on the fourth side 404 make a high-voltage terminal group, which is thus separated from the low voltage group arranged on the first side 401.

Of the terminals arranged on the second side 402, the terminal PGD arranged on its end part near the third side 403 has a low rated voltage, and the other terminals have high rated voltages. Thus, the terminal PGD and the terminals arranged on the third side 403 makes a low-voltage terminal group, which is thus separated from the high-voltage terminal group arranged on the second side 402.

A pad EXP-PAD is a bottom-side heatsink pad, and it is, when the IC is mounted on a board, connected to the ground plane inside the board with a plurality of vias. With this, satisfactory heat dissipation characteristics can be obtained.

Appliances Incorporating the Power Supply Circuits:

The power supply circuits according to the embodiments described above are particularly suitable for devices that are required to be reliable, and can be incorporated into not only consumer products (such as mobile devices, game machines, and cameras) but also vehicle-mounted appliances, industrial equipment, medical equipment, and the like.

Figure 10:
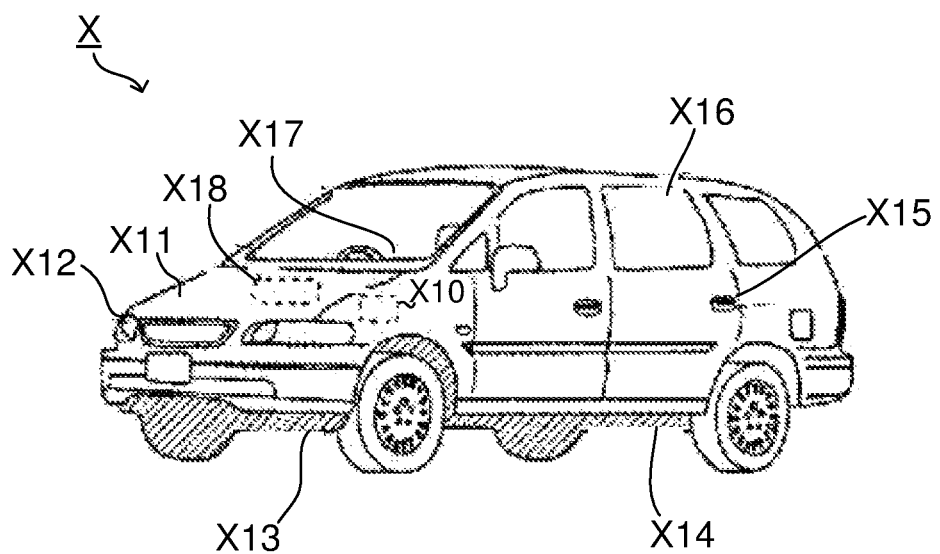
FIG. 10 is a diagram showing an external appearance of one example of vehicle incorporating various electronic appliances.
Figure 11:
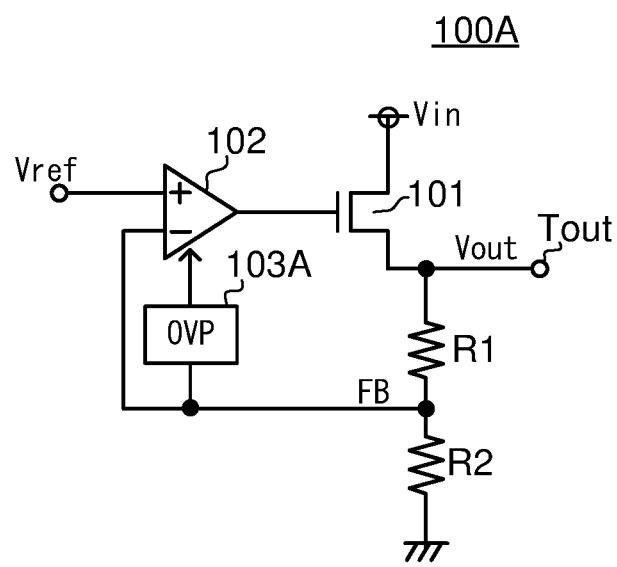
FIG. 11 is a diagram showing one example of a power supply circuit having an overvoltage protection circuit.
Figure 12:
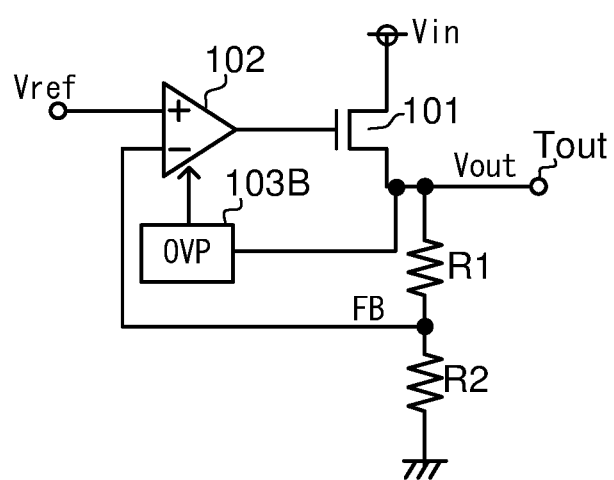
FIG. 12 is a diagram showing one example of a power supply circuit having an overvoltage protection circuit.

FIG. 10 is an exterior view showing an exemplary configuration of a vehicle incorporating various electronic appliances. The vehicle X of this exemplary configuration incorporates a battery X10 and various electronic appliances X11 to X18 that operate by being supplied with an input voltage from the battery X10. It should be noted that, for the sake of convenient illustration, any of the battery X10 and the electronic appliances X11 to X18 shown in FIG. 10 may be elsewhere than they are actually located.

The electronic appliance X11 is a traveling motor controller that controls the driving of a traveling motor.

The electronic appliance X12 is a lamp control unit that controls the turning on/off of HID (high intensity discharged) lamps, DRLs (daytime running lamps), or the like.

The electronic appliance X13 is a transmission control unit which performs control related to transmission.

The electronic appliance X14 is a body control unit that performs control with respect to the movement of the vehicle X (such as the control of an ABS (anti-lock brake system), an EPS (electric power steering), an electronic suspension, and the like).

The electronic appliance X15 is a security control unit which drives and controls door locks, burglar alarms, and the like.

The electronic appliance X16 comprises electronic appliances incorporated in the vehicle X as standard or manufacturer-fitted equipment at the stage of factory shipment, such as wipers, power side mirrors, power windows, dampers (shock absorbers), a power sun roof, and power seats.

The electronic appliance X17 comprises electronic appliances fitted to the vehicle X optionally as user-fitted equipment, such as vehicle mounted A/V (audio/visual) equipment, a car navigation system, and an ETC (electronic toll collection system).

The electronic appliance X18 is electronic appliance provided with a high-withstand-voltage motor such as a vehicle-mounted blower, an oil pump, an water pump, and a battery cooling fan.

The power supply circuits according to the respective embodiments described above can be incorporated into any of the appliances X11 to X18.

Modifications:

The embodiments of the present invention described above allow for many modifications made without departing from the spirit of the present invention.

For example, the switching regulator to which the present invention is applied is not limited to the synchronous rectification type described above; it may instead be of a non-synchronous rectification type, a step-up/-down type, an isolated/non-isolated type, or the like.

What is claimed is:

1. A power control device comprising:
   an output voltage controller configured to control an output voltage based on a feedback voltage corresponding to the output voltage; and
   an overvoltage protector configured to continue or stop operation of the output voltage controller based on a first detection result of whether the output voltage has exceeded an output voltage threshold value and a second detection result of whether the feedback voltage has fallen to or below a feedback voltage threshold value, wherein
   the overvoltage protector includes a judging portion to which the first detection result and the second detection result are input in parallel and that recognizes an abnormal drop in the feedback voltage based on the first detection result and the second detection result thus input.

2. The power control device according to claim 1, wherein the overvoltage protector is configured to
   continue the operation of the output voltage controller if the feedback voltage is equal to or lower than the feedback voltage threshold value and the output voltage is equal to or lower than the output voltage threshold value,
   continue the operation of the output voltage controller if the feedback voltage exceeds the feedback voltage threshold value, and
   stop the operation of the output voltage controller if the feedback voltage is equal to or lower than the feedback voltage threshold value, and the output voltage exceeds the output voltage threshold value.

3. The power control device according to claim 1, wherein the judging portion is an AND circuit to which both the first detection result and the second detection result are input.

4. The power control device according to claim 1, further comprising a second overvoltage protector configured to stop the operation of the output voltage controller if the feedback voltage exceeds an overvoltage set value.

5. A power supply circuit comprising the power control device according to claim 1, wherein
   the power supply circuit is a linear regulator,
   the power control device includes:
      an output transistor to which an input voltage is applied; and
      an error amplifier to which the feedback voltage and a reference voltage are input, the error amplifier being configured to drive, with an output thereof, the output transistor, and
   the overvoltage protector is configured to control the error amplifier.

6. An electronic appliance comprising the power supply circuit according to claim 5.

7. A power supply circuit comprising the power control device according to claim 1, wherein the power supply circuit is a switching regulator.

8. The power supply circuit according to claim 7, wherein the power control device includes:
      a first switching element and a second switching element connected in series between an input voltage and a ground potential;
      an error amplifier or a comparator to which the feedback voltage and a reference voltage are input;
      a driver configured to drive the first switching element and the second switching element based on an output of the error amplifier or the comparator,
   the power supply circuit further comprises:
      a coil having one end thereof connected to a connection node to which the first switching element and the second switching element are both connected; and
      a capacitor having one end thereof connected to another end of the coil, and
   the overvoltage protector is configured to control the driver.

9. An IC package that functions as the power control device according to claim 1, wherein
   the output voltage controller includes:
      a first switching element;
      a second switching element connected in series with the first switching element; and
      a driver configured to drive the first switching element and the second switching element,
   the IC package includes:
      a first external terminal for applying an input voltage to the first switching element;
      a second external terminal for applying a ground voltage to the second switching element;
      a third external terminal which is a power terminal for the driver;

a fourth external terminal for inputting a signal for switching the power control device between a shutdown state and an enabled state;
a fifth external terminal for applying the feedback voltage; and
a sixth external terminal for applying the output voltage,
the IC package further includes:
a first side;
a second side which is connected to one end of the first side and which extends in a direction crossing the first side; and
a third side which is connected to one end of the second side and which is opposite from the first side,
only first low withstand voltage terminals including at least the fifth external terminal are arranged at the first side,
only first high withstand voltage terminals including at least the first external terminal and the third external terminal are arranged at the second side, and
second low withstand voltage terminals including at least the second external terminal and the sixth external terminal are, along with the fourth external terminal, which is a high withstand voltage terminal and is arranged closer to the second side than the second low withstand voltage terminals, arranged at the third side.

10. The IC packaged according to claim 9, further comprising:
a power good function portion configured to output a flag when the feedback voltage reaches a predetermined voltage;
a seventh external terminal for outputting the flag;
an eighth external terminal connected to a connection node at which the first switching element and the second switching element are connected together; and
a fourth side which is connected to another end of the first side and to one end of the third side and which is opposite from the second side,
wherein second high withstand voltage terminals including at least the eighth external terminal are, along with the seventh external terminal, which is a low withstand voltage terminal and is arranged closer to the first side than the second high-voltage terminal, arranged at the fourth side.

11. A power control device comprising:
an output voltage controller configured to control an output voltage based on a feedback voltage corresponding to the output voltage; and
an overvoltage protector configured to continue or stop operation of the output voltage controller based on a first detection result of whether the output voltage has exceeded an output voltage threshold value and a second detection result of whether the feedback voltage has fallen to or below a feedback voltage threshold value,
wherein the overvoltage protector includes an AND circuit to which both the first detection result and the second detection result are input.

12. A power control device comprising:
an output voltage controller configured to control an output voltage based on a feedback voltage corresponding to the output voltage; and
an overvoltage protector configured to continue or stop operation of the output voltage controller based on a first detection result of whether the output voltage has exceeded an output voltage threshold value and a second detection result of whether the feedback voltage has fallen to or below a feedback voltage threshold value, wherein
the overvoltage protector includes an output voltage detector configured to output the first detection result and a feedback voltage detector configured to output the second detection result, and
the output voltage detector is configured to continue or stop detection operation in accordance with the second detection result.

* * * * *